United States Patent [19]

Vaughn et al.

[11] Patent Number: 4,747,954
[45] Date of Patent: May 31, 1988

[54] REMOVAL OF METALS FROM SOLUTIONS

[75] Inventors: Walter L. Vaughn; Rafael E. Guerra, both of Lake Jackson, Tex.

[73] Assignee: The Dow Chemical Company, Midland, Mich.

[21] Appl. No.: 776,347

[22] Filed: Sep. 16, 1985

[51] Int. Cl.$^4$ .......................... B01D 15/00; C02F 1/28
[52] U.S. Cl. .................................... 210/670; 210/681; 210/687; 210/688; 585/820
[58] Field of Search ............... 210/670, 681, 687, 688; 585/820; 208/251 R, 308

[56] References Cited

U.S. PATENT DOCUMENTS

| | | | |
|---|---|---|---|
| 3,493,498 | 2/1970 | Abrams et al. | 210/673 |
| 4,083,782 | 4/1978 | Kunin | 210/674 |
| 4,120,653 | 10/1978 | Smolka | 210/687 |

OTHER PUBLICATIONS

Dorfner, Konrad; Ion Exchangers, Properties and Applications; 1972, pp. 36–37.
Kunin, Robert; Ion Exchange Resins; 1972, pp. 47, 69, 308–315.

Primary Examiner—Ivars Cintins
Attorney, Agent, or Firm—W. J. Lee

[57] ABSTRACT

Particles, fibers, or filaments of ethylene/carboxylic acid copolymers or terpolymers, especially in highly porous or microporous form, are employed in removing contaminants from solution in aqueous and/or organic liquids, especially metal contaminants. The porous polymers, having a surface area/weight ratio of at least about 0.5 m$^2$/gm, are useful alone, but may also be used in conjunction with, or in tandem with, previously known ion exchange resins such as polyacrylic acid crosslinked with divinylbenzene.

23 Claims, No Drawings

REMOVAL OF METALS FROM SOLUTIONS

FIELD OF THE INVENTION

Metals are removed from solutions by using ethylene/unsaturated carboxylic acid copolymers.

BACKGROUND OF THE INVENTION

Copolymers of ethylene and unsaturated carboxylic acids, such as ethylene/acrylic acid, ethylene/methacrylic acid and the like, are known. It is known that such polymers can be produced as pellets, powders, small strands, and the like to increase the surface area/weight ratio. U.S. Pat. No. 3,798,194 discloses the digestion of ethylene/acrylic acid (EAA) polymers in an alcoholic alkali (e.g. NaOH) with stirring to spontaneously convert the polymer into colloidal size particles. U.S. Pat. No. 3,790,521 discloses the digestion of EAA polymers in an amine, with agitation, to produce non-colloidal size small particles and short, fine fibers. U.S. Pat. No. 3,801,551 discloses hot-drawing EAA polymers as strands, chopping the strands into pellets, digesting the pellets with an alkali, and shearing the pellets into short, fine fibers. Whereas such above forms of the polymers are operable in the invention described hereinafter, there has now been found a novel method of producing high surface area polymers (e.g. EAA) wherein the particles and fibers are large enough to be more easily managed than the colloidal sizes, and more efficient than the fine fibers of the above-discussed patents. In accordance with this novel polymer preparation, there are prepared particles and fibers which are highly porous, having a substantial amount of microporosity, thereby providing very high surface areas per bulk volume of the particles. This novel preparation is discussed more fully hereinafter.

As used in this disclosure, the term "melt index" (M.I.) refers to the melt flow rate value measured in accordance with ASTM D-1238.

SUMMARY OF THE INVENTION

Metal values, especially those which are polyvalent, are removed from solution in organic and/or aqueous media by contact with ethylene/unsaturated carboxylic acid (ECA) copolymers, especially ethylene/acrylic acid (EAA) or ethylene/methacrylic acid (EMAA) copolymers, said polymers being high surface area particles or fibers, especially particles or fibers which are highly porous. The ECA copolymers may be those containing —COOH groups or —COOX groups, where X denotes a carboxylate salt moiety.

Elements of the following groups of The Periodic Table of the Elements, when in cation form, are within the ambit of the present invention, and are taken up by the ECA copolymer particles and fibers having microporosity, including particles and fibers which have been conjoined into a contiguous, but highly porous configuration:

| Group | Especially These Metals |
|---|---|
| IA | Li, Na, K, Rb |
| IB | Cu, Ag, Au |
| IIA | Mg, Ca, Sr, Ba |
| IIB | Zn, Cd, Hg |
| IIIA | Al, Ga, In |
| IIIB* | Sc, Y, La, Ce, U |
| IVA | Ge, Sn, Pb |
| IVB | Ti, Zr, Hf |
| VA | As, Sb, Bi |
| VB | V, Nb, Ta |
| VIA | Se, Te |
| VIB | Cr, Mo, W |
| VIIB | Mn, Re |
| VIII | Fe, Co, Ni, Ru, Rh, Pd, Os, Ir, Pt |

*including the lanthanide and actinide series

DETAILED DESCRIPTION

There are various liquids which contain metal values which are desirably removed. These liquids may be organic or aqueous or a mixture of organic and aqueous. The liquid may be a waste stream which requires metal removal before being conveyed to public waters, it may be, e.g., a product stream, a by-product stream, a process feed stream, or an intermediate process feed stream between process stages. There is an ever-present need to find better, more efficient methods for removing metals frpm such streams, whether such metals are merely contaminants, or are additives which may have been part of the process. In some streams there is a need for efficient ways of removing a broad spectrum of metals, preferably in a single operation. Spills from leaky or broken vessels, which contain metal values, often require clean-up to remove the metals to a safer or better place.

The present invention provides the means for taking up, and chemically holding, such metal values.

The liquid, from which one desires to remove metal cations, is preferably one which is substantially inert to the ECA polymer. As used herein, an "inert" liquid is one which does not substantially react with, or dissolve, the ECA polymer. Some liquids (especially when hot) may swell the ECA polymer, or be somewhat imbibed by the ECA polymer, yet the polymer can still function, repeatedly, as a metal cation removal agent.

It is possible, however, to melt or dissolve the ECA polymer in a hot solvent which contains polyvalent metal cations wherein the polymer reacts and holds the metal cations. Then upon precipitation of the polymer by addition of a non-solvent and/or by chilling the solution, the polymer will generally form a solidified agglomerate (unless shearing agitation is employed to cause dispersion). The precipitated polymer can then be separated from the liquid, taking the metal values with it, but may not be efficiently employed again without reforming it as a high surface area polymer.

The ethylene/unsaturated carboxylic acic (ECA) interpolymers for use in the present invention comprise, preferably, ethylene/acrylic acid copolymers (EAA) and ethylene/methacrylic acid copolymers (EMAA), though other unsaturated polymerizable carboxylic acids, such as crotonic acid, itaconic acid, fumaric acid, maleic acid, and the like may be used. The ethylene/acid polymers may also contain minor amounts of other polymerizable unsaturated monomers, such as propylene, butene, styrene, vinyl compounds, acrylic esters, methacrylic esters, and the like.

The amount of the acid groups in the polymer may vary over a wide range of about 10% to about 40% by weight, preferably about 14% to about 35%, most preferably about 20% to about 35%.

When employed as a colloidal or very fine suspension in water, the alkali metal, ammonium, or monovalent organic cation of an ECA copolymer salt is found to exchange with the non-alkali metal cations in a metal-containing solution, thereby forming flocs. These flocs are then filtered out, or otherwise removed, from the solution, taking the metal cations with them. When employed as larger particles or as fibers added to the metal-containing solution, these also by ion-exchange, take on the non-alkali metal cations and are filtered out, or otherwise removed, from the solution.

Fibrous arrays, such as beds or mats, can serve the dual role of filter (for "non-attachable" impurities) and as a chelant for the "attachable" impurities; thus inert solid impurities as well as reactive solid impurities and dissolved impurities are removed.

As stated supra, various forms of the ECA polymers may be used, with various degrees of efficiency, including (but not limited to) those produced by the techniques in U.S Pat. Nos. 3,798,194, 3,790,521, and 3,801,551. A particularly effective and most preferred form is the novel porous form prepared in accordance with cofiled patent application Ser. No. 776,534. Stated simply, the preferred porous polymers are prepared by reacting cold-drawn (oriented) polymer with a reagent which reacts with the reactable pendant side-groups on the polymer (such as —COOH groups), causing swelling of the polymer; then after fibrillation and washing, the fibers are found to be extensively microporous, a substantial amount of the pores being of sub-micron size. This porosity and microporosity is an especially useful feature in the present invention, most especially when the polymer is used in the dual role of chelating ion-exchanger and filter. The surface area/weight ratio of such porous polymers is at least about 0.5 $m^2/gm$, preferably at least 2 $m^2/gm$ and can be as much as 15 $m^2/gm$ or more, depending on concentration of —COOH groups in the copolymer, the extent of cold stretching, and the thoroughness of the reaction with the reagent (such as NaOH).

The temperature used in the present invention may be any convenient temperature below the softening point of the polymer and the decomposition or degradation or boiling temperature of the metal-containing solution. Operating at temperatures at which the polymer melts or fuses, or at temperatures at which the metal-containing solution is not stable, would be counterproductive. One would not, of course, want to use temperatures at which the metal-containing solution is frozen or non-fluid.

The amount of polymer used in removing the metals from the solution should be commensurate with the concentration of the metals in the solution, for a given polymer. The extent to which the polymer can chelate with or attach to the metals is directly related to the concentration of the acid groups pendant from the polymer molecule. It is preferred to use polymers which contain at least about 10% by weight of acid groups, preferably about 20-35%, though polymers containing as much as 40% or more are contemplated here. If the first treatment with polymer is found to have given incomplete removal of the metals, due to use of too small an amount, then one or more further treatments can be easily done to essentially remove the metals to at least a tolerable level. Highly efficient removal of metals is achieved by passing the solution through a bed or column of the polymer, either upflow or downflow or crossflow. Highly efficient removal of metals is also achieved by mixing the polymer into the solution, then filtering out the polymer or decanting the solution.

Of special interest within the purview of the present invention are polyvalent heavy metals, especially those of a valence of 2 or 3, which are desirably removed from solutions, though other polyvalent metals are also removed. For example, Al, Zn, V, Ni, Sr, Fe, Mn, Co, Pb, Cr, Cu, Ti, Ca, Mg, Ba, Ag, Au, Pd, Ir, Ru, As, Cd, Hg, Se and Rh show a high affinity for ethylene/acrylic acid copolymer (EAA), whereas Os, Re, and Pt show a lower affinity for the same EAA.

One advantage to using the ECA polymers, in contradistinction to customarily used ion exchange resins, is that these ECA polymers can be used over a wide spectrum of pH values, from highly acid to highly basic (typically a pH of 3—13). Many commercially available ion exchange resins are designed for use only at an acid pH or at an alkaline pH. Furthermore, the present ECA polymers are quite inexpensive in comparison to commercially available ion exchange beads, are more easily regenerated at various pH's, and, if desired, can be inexpensively sacrificed in order to salvage the metal values attached to them. For example, if a highly valuable noble metal (e.g. gold), platinum metal, rare earth metal, actinide metal, transition metal, and the like is attached to the ECA, the inexpensive ECA can be sacrificed in attaining optimum salvaging of the metal. Furthermore, even if the metal has little or no intrinsic salvage value, the ECA which holds the metal can be employed as an ingredient in other plastics or composites where the metal is not a detriment or can be molded into useful articles.

The ECA polymers are generally resistant enough to dissolution by most liquids, though they do swell in many liquids. However, resistance to swelling and dissolution can be imparted to the ECA polymers by cross-linking the ECA in accordance with known procedures. Crosslinking of such polymers via irradiation and use of peroxides is known. Also, crosslinking elevates the softening temperature.

Regeneration of the ECA polymer to remove the affixed metal values and to re-use the polymer for further metal removals from solutions is done, e.g., by treatment with a strong mineral acid (e.g. HCL, $H_2SO_4$, $HNO_3$, $H_3PO_4$) or by treatment with an alkali salt of EDTA (ethylenediamine tetraacetic acid) in solution with a strong base (e.g. NaOH, $NH_4OH$).

The following examples illustrate embodiments of the present invention, but the invention is not limited to the particular embodiments shown.

EXAMPLE 1

Preparation of Microporous Fibers From Oriented Granules

Granules chopped from an oriented strand of an ethylene/acrylic acid copolymer (20% AA, 300 M.I.) were mixed with 0.5 N NaOH at a molar ratio of 0.4 NaOH/1.0 AA. The mixture was heated at 50° C. overnight to swell the granules, which about doubled the volume of each granule and made them soft. Excess liquid was drained off and replaced with deionized water, and the mixture was placed in a Waring blender to cause fibrillation into fine fibers. The fine fibers were acidified (to about 4-6 pH) to precipitate any very small fines or colloidal polymer; this step is optional, but it increases the ease of filtration and results in wash waters substantially free of contamination. The fibrous mass is washed and vacuum-filtered on a coarse filter; an optional washing with acetone or methanol provides rapid drying. After drying at a temperature not in excess of 60° C., the fibers were screened to remove dust and to remove any large particles. The 20-40 mesh microporous fibers exhibited over 4 $m^2/gm$ surface area (nitrogen absorption/BET method).

A sample of 1,1-dichloroethane, containing about 3% by wt. of anh. HCl and about 29 ppm of iron in the form of soluble and colloidal $FeCl_3$ was passed through a bed of the microporous fibers. The brown solution was rendered colorless by the treatment and the iron content was reduced to less than 1 ppm. The fibers became discolored by the iron collected therein.

EXAMPLE 2

Iron-Removal from 1,1-dichloroethane

Another contaminated portion of the 1,1-dichloroethane of Example 1 above was contacted with some of the microporous fibers of Example 1 in a bottle. The fibers took on the brown color (as ethylene/ferric acrylate copolymer) and were filtered out of the liquid, which became water-white and had less than 1 ppm iron remaining in it.

EXAMPLE 3

Iron-Removal and Regeneration

A sample of the EAA microporous fibers (20-40 mesh) was placed in a 25-ml burette with glass wool beneath and above it to prevent fiber displacement. About 20 inches of bed depth was obtained. A 100-ml portion of the 1,1-dichloroethane (of Example 1 above) was passed through the bed at a flow rate of 5 ml/min. (about 18-20 min. residence time in the bed). About 29 ppm iron was in the solution prior to treatment and there was less than 1 ppm iron remaining in the liquid after passing through the bed; the liquid became water-white. About 1 pint (568 ml) of the sample was then passed through the fiber bed with the same results, and no breakthrough was observed. The polymer near the top of the bed became yellowish, indicating the formation of ethylene/ferric acrylate copolymer.

The bed of fibers was regenerated for additional use by passing one bed volume of methanol through the bed to replace the 1,1-dichloroethane (this step is optional). Then one bed volume of deionized water was passed through to replace the methanol. Two bed volumes of concentrated HCl solution were passed through to remove the iron as ferric chloride, thereby regenerating the polymer to the original EAA form. The acid was flushed from the bed with deionized water and the water was flushed out with methanol. The bed was ready for re-use.

EXAMPLE 4

Iron-Removal from Water and Regeneration

A 25 ml sample of an aqueous stream containing 1000 ppm $Fe^{+++}$ was passed through a bed of EAA microporous fiber (20-40 mesh, 20% AA/80% ethylene, about 5 $m^2/gm$) with a contact time of 20 minutes. The starting solution was dark brown and the treated solution was colorless. The treated stream was passed through a second bed of microporous fiber with a contact time of 5-6 minutes and then tested for iron content. Less than 1 ppm was detected by emission spec.

The top layer of the first bed was discolored to a dark brown color during use. The first bed was regenerated to its active, carboxylic acid form, by passing three bed volumes of concentrated HCl through the bed, followed by a thorough wash with deionized water. The regenerated bed was white, similar to its appearance before use. The concentrated HCl used in regeneration was yellow, due to the presence of iron.

EXAMPLE 5

Removal of Cu, Zn, and Ni

A 25 ml portion of an aqueous stream containing 1.6 ppm $Cu^{++}$, 10.0 ppm $Zn^{++}$, 6.2 ppm $Ni^{++}$, and 2.1 ppm $Ni^{+++}$ was polished to less than 1 ppm metal content (almost undetectable levels of metals) by contact for 30 minutes with a bed of 50-100 mesh microporous fiber (about 15 $m^2/gm$ surface area, 20% AA/80% ethylene) copolymer. The bed contained a large excess capacity compared to the solution used.

EXAMPLE 6

Removal of Cr

A 25 ml sample of an aqueous stream containing 14.0 ppm $Cr^{+++}$ was passed through a bed of EAA microporous fibers (20% AA/80% ethylene, 20-40 mesh, about 5 $m^2/gm$) with a contact time of 6 minutes. The treated solution contained 0.24 ppm $Cr^{+++}$ by analysis (98.3% removal).

EXAMPLE 7

Removal of Metals from Water

Aqueous streams of precious metals were used in metal recovery by contact with EAA microporous fiber as follows: 3 ml samples of the respective solutions were placed in bottles along with about 0.1 g of AA fiber (derived from 20% AA/80% ethylene of 20-40 mesh, 10 $m^2/gm$ surface area). Overnight contact time was allowed (the data are reported in ppm's):

| Metal | Before Treatment | After Treatment | % Removed | In Polymer After Use |
|---|---|---|---|---|
| Au | 1100 | <1 | 100 | 33,000 |
| Ag | 800 | 56 | 93 | 28,000 |
| Ir | 224 | 110 | 49 | 3,200 |
| Ru | 262 | 186 | 29 | 760 |
| Pd | 476 | 400 | 16 | 2,300 |

Gold and silver were readily removed from solution while some utility for recovery of iridium, ruthenium, and paladium was observed. For precious metals recovery, the expended fibers could be ashed and the oxides reduced with hydrogen or dissolved in nitric acid or the like.

EXAMPLE 8

Aluminum Removal from Acid Solution

An aqueous stream containing 3% $AlCl_3$ and 1% HCl was passed through a bed of EAA fiber (20-40 mesh, 20% AA/80% ethylene, about 5 $m^2/gm$) with a contact time of 30 minutes. Excess capacity was available in the bed. The aluminum content of the treated solution was reduced to 160-300 ppm Al by a single exposure to EAA. Metal removal to below 1000 ppm was desired.

EXAMPLE 9

Simultaneous Removal of Several Metals

An aqueous solution containing $Cr^{+++}$, $Zn^{++}$, $Ni^{++}$, and $Cu^{++}$ ions was prepared from the respective metal chlorides and analyzed for metal content by emission spec. A 25 ml portion of the heavy metal ion solution was treated with 12 ml of an EAA dispersion containing 12 wt % solids (300–500Å diameter particles in an aqueous ammoniacal dispersion derived from a copolymer containing 20 wt % acrylic acid/80 wt % ethylene and having a 300 melt index). A second 25 ml portion of the metal ion solution was diluted with 12 ml of deionized water and designated as a "control sample". The treated sample pptd. a blue floc which was readily removed by filtration. A small portion of the treated solution was removed for analysis after about 3 minutes reaction time, then the treatment was repeated a second and third time. Analysis concentrations were adjusted for dilution effects and results are tabulated below in ppm's:

| Metal Ion | Control (Starting Solution) | After 1st Treatment | After 2nd Treatment | After 3rd Treatment | % Removal of ion |
|---|---|---|---|---|---|
| $Cu^{++}$ | 720 | 140 | 24 | 1.6 | 99.8 |
| $Zn^{++}$ | 1400 | 410 | 110 | 10.0 | 99.3 |
| $Ni^{++}$ | 670 | 260 | 58 | 6.2 | 99.1 |
| $CR^{+++}$ | 590 | 140 | 21 | 2.1 | 99.6 |
| Total Metal Content | 3380 | 950 | 213 | 19.9 | — |
| % Metal Ion Removed, Cumulative | 0 | 71.9* | 93.7 | 99.4 | 99.4 |

*Note: 72% observed removal vs. 87% theoretical maximum expected (based on EAA added) indicates 82% effective use of carboxylic acid groups with 3 minutes exposure time.

EXAMPLE 10

Lead Removal by Ion Exchange Bead/EAA Fiber Composite

An EAA copolymer containing 80 Wt. % ethylene-20 wt. % acrylic acid was melt spun at 125° C. into a 10 micron filament. The oriented filament was chopped to 6 mm fiber length and swollen for 60 minutes at 55° C. in 0.5N NaOH solution. The excess caustic was removed by two water rinses and the fibrous mass was diluted into an aqueous slurry containing 2.0 wt. % of the microporous fiber. The slurry was cast onto a 50 mesh stainless steel wire screen and the water drawn off under vacuum to yield a non-woven felt or mat of 0.3 cm thickness and about 0.24 gm/cc bulk density (70% void volume). The mat was dried and cut into discs of 4.0 cm diameter. The cut edges of a fibrous disc were sealed with epoxy cement and the disc was then sealed at its edges to a short glass column with epoxy to prevent edge leakage. A 40 mesh polypropylene scrim was attached beneath the mat as an additional physical support to prevent sagging. A 2.0 cm deep bed (L/D ratio of 0.5) of macroporous ion exchange beads (90% acrylic acid-10% divinylbenzene cross-linked copolymer; DOWEX MWC-1 resin) was deposited upon the 4.0 cm fibrous disc. A 40 mesh polypropylene scrim was attached above the ion exchange beads to keep the bed in place. The two component (composite) device thus formed contained 87% beads and 13% fiber by volume, 96% beads and 4% fiber by weight, and on a capacity or molar equivalent basis contained 99% bead chemistry and only 1% fiber chemistry. The fiber/bead composite is referred to herein as FBC. A separate 2.0 cm deep bed (L/D ratio of 0.5) of the same ion exchange beads was prepared for comparative use.

A feed stream containing 51.0 ppm lead (divalent lead, Pb,++ ion from lead nitrate) was pumped through each metal removal system at a flow rate of 20 bed volumes per hour. Feed was introduced at the top and allowed to percolate through the ion exchange materials and exit at the bottom of the column, which is a normal ion exchange treatment. The lead concentration in the stream treated with only ion exchange beads was 1.5 ppm lead (about 97.0% lead removal at about 180 seconds contact time). The lead concentration in the stream treated with the composite device was less than 0.01 ppm lead (99.98% lead removal) after about 160 second contact time followed by about 20 seconds of contact with microporous EAA fiber. Generally less than 0.05 ppm lead is allowed by E.P.A. pollution control guidelines.

EXAMPLE 11

Fiber Kinetics for Copper Removal

Microporous fibers derived from 80% ethylene-20% acrylic acid copolymer were cast into mats, as described in Example 10. A 40 mm diameter (L/D of 0.08) disc (cut from the mat) was sealed at the edges with epoxy and attached to the walls of a short column with epoxy cement (to prevent edge leakage of the untreated feed stream). A feed stream containing 3.9 ppm of cupric ion (from a cupric sulfate solution) was pumped through the fibrous mat at various flow rates; results are shown below:

| Contact Time (sec.) | Flow Rate (bed vol./hour) | $Cu^{++}$ Conc., after Treatment (ppm) | $Cu^{++}$ removal (percent) |
|---|---|---|---|
| 6.4 | 560 | <.05 | >99 |
| 4.1 | 880 | <.05 | >99 |
| 1.9 | 1840 | <.05 | >99 |
| 1.2 | 2800 | <.05 | >99 |
| 1.1 | 3300 | <.05 | >99 |
| 0.9 | 4000 | <.05 | >99 |

Even at the exceedingly fast flow rate of 4000 bed vol./hr. the 3 mm thick mat of microporous ion exchange fiber showed exceptional metal removal kinetics to polish the toxic copper ions to easily meet EPA pollution control guidelines.

EXAMPLE 12

Calcium Removal Using Beads and Fiber/Bead Composite (FBC)

The microporous fiber/ion exchange bead composite (FBC) device of Example 10 (0.3 cm. thick fiber mat, 2.0 cm bead bed depth, 40 mm bed diameter) was used for calcium ion removal and compared to a 2.0 cm bed depth of the ion exchange beads* (beads only) used at similar flow rates. A feed stream containing 2.9 ppm calcium ions was treated and the results are shown below:

| Treatment | Bed vol./hr. (flow rate) | $Ca^{++}$ Conc., after treatment (ppm) | $Ca^{++}$ removed (percent) |
|---|---|---|---|
| FBC device | 15 | 0.37 | 87 |
| Beads only* | 15 | 0.55 | 81 |
| FBC device | 35 | 0.29 | 90 |

-continued

| Treatment | Bed vol./hr. (flow rate) | $Ca^{++}$ Conc., after treatment (ppm) | $Ca^{++}$ removed (percent) |
|---|---|---|---|
| Beads only | 35 | 1.10 | 62 |
| FBC device | 50 | 0.26 | 91 |
| Beads only | 50 | 1.45 | 50 |

*Macroporous beads are 20-50 mesh DOWEX MWC-1 resin, 90% polyacrylic acid cross-linked with 10% divinylbenzene.

The microporous fiber/ion exchange bead composite device gave better metal removal than ion exchange beads alone and the metal removal improvement became more obvious at higher flow rates.

EXAMPLE 13

Oriented Microporous Fibers for Iron Removal

Oriented microporous EAA fibers were derived as follows: A 100 gram filament, of about 1/16" diameter, and composed of 80 wt. % ethylene-20 wt. % acrylic acid copolymer was cold-drawn by hand by a factor of 1.5-2.0 and chopped into 1/16" segments and placed into a swelling bath containing 0.5 N NaOH solution at 55°-60° C. The filament segments were swelled for four hours and turned white and rubbery during swelling. The filaments were drained, washed with de-ionized water, and placed in Waring blender with the blade placed in a backward position (for beating). The soft, rubbery filament was bent into a pulp in a few seconds by the blunt blades of the Waring blender. Fibers of about ⅛" length and 10-30 microns were common with fibrils (branching) of 2-5 microns being very abundant. Upon close examination the fibers were found to be ribbon-like with fibrils composed of small ribbons pendent from the parent ribbon. A slurry of 2% by wt. was prepared by dilution with de-ionized water.

A four-inch layer of the oriented fiber was deposited in the bottom of a 100 ml burette and a 16" layer of ion exchange beads* placed in a second layer above to form a layered bed of 20" overall bed depth (denote as bed A). A 20" column of the same ion exchange beads was formed in a second 100 ml burette (denote as bed B), and a third bed containing a 20" depth of oriented microporous EAA fiber (denote as C). Iron removal data are shown below.

*Macroporous beads are 20-50 mesh MWC-1 resin, 90% polyacrylic acid cross-linked with 10% divinylbenzene.

| | Bed Used | | |
|---|---|---|---|
| Material Used | A Beads/Fiber | B Beads | C Fiber |
| Relative bed Capacity (theoretical) | 81 | 100 | 5 |
| Beads by Volume, % | 80 | 100 | 0 |
| Fiber by Volume, % | 20 | 0 | 100 |
| Flow rate; bed vol./hr. | 8.8 | 9.5 | 18 |
| Feed Solution, $Fe^{+++}$,ppm | 67 | 67 | 67 |
| After Treatment,ppm | <.05 | 1.8 | <.05 |
| Iron removal, % | >99.9 | 97.3 | >99.9 |

The use of microporous fiber (C) gives better metal removal than polyacrylic acid ion exchange beads (B). Composite beds containing fiber and beads (A) increases the overall theoretical capacity of a fixed volume bed (by a factor of 16 for bed B compared to bed C) with over 99.9% iron removal observed.

EXAMPLE 14

Microporous Granular EAA Beads for Copper Removal

An ethylene-acrylic acid copolymer (m.p. about 98° C.) containing 20% AA by weight and exhibiting a 300 melt index was extruded and die-face-cut into granules (i.e., granules extruded under the surface of water and cut directly from the die face). Granules cut in this manner anneal and do not exhibit orientation in their morphology. The unoriented granules were swollen five hours at 55°-50° C. in excess 0.5 N NaOH solution drained, water-washed, and beat into a small-particle slurry in a Waring blender for 30-60 seconds. No substantial porosity was observed. The polymer/water slurry was then filtered and again thoroughly reswelled for 1 hour in 0.5 N NaOH at 45° C. to insure complete swelling and conversion to the wettable, microporous sodium salt form. The slurry was drained, filtered, and thoroughly water-washed on the filter to remove unreacted caustic and also acetone washed while wet; this dries the polymer. Wettable microporous particles of 20-40 mesh were obtained.

A ten-gram portion of the microporous particles above was added to 100 ml of a 1% by wt. of cupric sulfate solution and left overnight. The particles turned very dark blue. The particles were isolated by filtration, thoroughly water-washed, and air dried. Copper analysis was conducted (emission spec. on ICP Jarrell Ash Mod. Atom - Comp Series 1100) and 5.4 wt. % copper was observed.

The particles were highly microporous as determined by electron microscopy. The microporous structure could best be described as "spongelike." The dark blue particles melted above 150° C. and were readily compression molded (hot press) into blue sheets and films at 150° C. and above.

A one gram sample of the blue particles (5.4% copper content) was treated five minutes with 10 ml of an aqueous solution containing 17% sodium salt of EDTA and 3% ammonia, then rinsed with a second 10 ml portion of the solution. The particles became very white (as the parent beads) and metal analysis showed less than 70 ppm copper content remaining. The particles were again placed in copper solution and immediately turned blue. The Na-EDTA ammonia treatment was judged to be very useful for regeneration of the microporous particles.

A one-gram sample of the blue particles (5.4 Wt. % copper content) was treated overnight with concentrated hydrochloric acid then washed with more concentrated hydrochloric acid, then water washed and air dried. The particles were pale yellow in color, and very hydrophobic. A wash with dilute caustic produced wettable particles. The caustic was washed out thoroughly and the particles found suitable for reuse in copper removal from aqueous streams, and also suitable for molding and powder coating applications (M.P. 98°-100° C.).

Micropores from 2 microns down to less than 0.1 micron were observed by electron microscopy at 5,000-20,000 magnifications using a JEDC JSM-T300 Scanning Electron Microscope.

The procedures outlined were repeated several times with copper uptake ranging from 5% to 8 wt. % and pore sizes ranging from 2 micron to 0.05 microns with an average pore size of 0.1-0.3 micron pore diameter (submicron pores) observed in the particles in the acid form, sodium salt form, and copper salt form.

EXAMPLE 15

Microporous EAA Wafers for Selenium Removal

An extruded monofilament of a copolymer (composed of about 20 wt. % acrylic acid and 80 wt. % ethylene and exhibiting a melt flow value of 300 and having a weight average molecular weight of 25,000 and a number average molecular weight of 6140 as determined by gel permeation chromatography in tetrahydrofuran) was cold-drawn by hand to achieve 50-55% orientation. A 100 gram filament sample of about 1/16" diameter was placed in a beaker containing 0.5 N NaOH solution and allowed to swell at 50° C. for five hours, then thoroughly washed in de-ionized water, air dried, and sliced into wafers about 1/32" thick by 1/16" diameter. When viewed under a microscope, the wafer end surfaces (cut surfaces) exhibited many tiny fibers oriented directly toward the cut surface. The fibers were about 10 micron thickness and contained porous substructures of ribbon-like appearance. Capillary structures of 10-30 micron diameter were observed between fibers and fiber bundles. The capillary structures extended deep into the wafer interior much resembling the "end grain" in wood. The fiber and capillary walls exhibited a rough spongy appearance with pore sizes of 0.05 micron and less (as viewed by electron microscopy).

The wafers described above were placed in a 16" deep bed in a burette. A feed solution containing 9.6 ppm of $Se^{++}$ (as selenium sulfate) was pumped through the column at 14 bed vol./hr. flow rate. The treated stream contained less than 0.05 ppm selenium (over 99.4% selenium removal) as determined by emission spectroscopy.

EXAMPLE 16

Oriented Microporous Fiber for Toxic Metal Ion Removal

Oriented microporous fibers (same as example 15) were placed in a 20" deep bed in a 100 ml burette and toxic metal ion solutions containing arsenic ions, mercuric ions, cadmium ions, lead ions or silver ions were treated. Results are shown below:

| Metal Ion Removed | Un-treated (ppm) | Solution pH | Residence time, min. | Treated, or Final Conc. (ppm) | % Metal ion Removed |
|---|---|---|---|---|---|
| $As^{+++}$ | 1.4 | 5 | 5.5 | <0.09 | >93 |
| $Hg^{++}$ | 12 | 6 | 6.5 | <0.01 | >99.9 |
| $Cd^{++}$ | 7 | 5 | 5.5 | <0.01 | >99.9 |
| $Pb^{++}$ | 5.2 | 6 | 5.5 | <0.01 | >99.8 |
| $Ag^+$ | 250 | 6 | 5.0 | 0.05 | >99.9 |

The toxic metal cations were readily removed from solution by oriented microporous fibers derived from EAA copolymer. Over 99% metal removal was typical and treated solutions generally met pollution control guidelines for outfall into public waters.

EXAMPLE 17

Uranium Removal and Recovery As Ionomer

A 0.1 gm sample of oriented EAA microporous fiber of the present invention was placed in a bottle with a few ml. of a solution containing 1000 ppm of uranium (as uranium acetate) and left in contact overnight. The solution was decanted and filtered and found to contain less than 1 ppm uranium (over 99.9% uranium removal). The fiber turned bright yellow during reaction and was washed thoroughly with deionized water and dried. The dry fiber contained 25.0 wt. % uranium, as measured by emission spectroscopy.

EXAMPLE 18

Non-porous EAA vs Porous EAA for Copper Ion Removal (for comparison purposes)

Unoriented, substantially non-porous particulate EAA of 20-40 mesh was prepared from EAA copolymer granules (20% AA-80% E, 300 MI) using practices taught in U.S. Pat. No. 3,801,551 and placed in a 100 ml burette packed to obtain a 20" column. A flow rate of 14.6 bed vol./hr. was used for a feed containing 900 ppm of copper (as cupric sulfate). The treated solution contained 900 ppm copper (no apparent copper removal). The column bed turned pale green throughout during use, without any visible color layers being formed.

Oriented, porous EAA fibers were prepared (as in Example 13) from the same polymer as used in the instance above (20% AA-80% Ethylene, 300 melt flow value). The EAA beads were extruded into a strand and cold-drawn to 30-35% orientation prior to swelling. Both samples were swollen 5 hours at 50° C. in 0.5 N NaOH solution. A 20-40 mesh size of the oriented, microporous fiber (resembled small ribbons with slot-like porosity) was packed into a 100 ml burette and the 900 ppm copper feed was treated at a flow rate of 14.6 bed vol./hr. The treated solution contained <1 ppm copper (>99.9% copper removal). A dark blue colored layer appeared at the top of the white column as a result of the copper removal. The dark blue layer became deeper as flow was allowed to continue; the sample for analysis was taken after about five bed volumes of flow (treated solution) were discarded. Dilution effects are avoided and a representative sample is insured by this procedure.

A solution containing 17.6% Na-EDTA and 3.5% ammonia was pumped through the bed of microporous EAA fiber at 14.6 bed vol./hr. flow rate. Three bed volumes were used to elute a dark blue solution. Three bed volumes of deionized water were then pumped through the bed as a purge. The bed was regenerated to the reusable ammonium form and was identical to its original (unused) white color and appearance.

A second use cycle gave >99.9% copper removal and the bed was regenerated a second cycle with Na-EDTA/$NH_3$ without incident.

This example clearly indicates the importance of microporosity in ECA fibrous materials, especially in the phenomenon of metal cation removal.

EXAMPLE 19

Simultaneous Removal of Metals

| Metal in Solution | Metal in Untreated Solution (ppb) | Metal(ppb) in Solution after Treatment | |
|---|---|---|---|
| | | Microporous Wafer | Microporous, Oriented Fiber |
| Zn | 159 | 57 | 54 |
| V | 45 | 22 | 8 |
| Ni | 36 | 15 | ~1 |
| Sr | 46 | 2 | 6 |

-continued

| Metal in Solution | Metal in Untreated Solution (ppb) | Metal(ppb) in Solution after Treatment | |
|---|---|---|---|
| | | Microporous Wafer | Microporous, Oriented Fiber |
| Fe | 78 | 17 | 8 |
| Mn | 115 | 18 | ~1 |
| Co | 43 | 9 | 4 |
| Mo | 8 | 6 | ~1 |
| Sn | 43 | — | ~1 |
| Cr | 66 | 21 | ~1 |
| Ti | 199 | 97 | ~1 |
| Mg | 41 | <1 | <1 |

A solution containing a spectrum of above metals was pumped at a flow rate of 13.5 bed vol./hr. through a 16 inch column each of microporous oriented fibers or microporous oriented wafers substantially as in accordance with Example nos. 15 and 16. Metal analysis at the ppb level was measured using "counts" on an emission spec. on an ICP Jarrell Ash Model. Atom-Comp series. Treatment with fiber or wafers reduced all metal concentrations simultaneously.

EXAMPLE 20

Alkali Metal Ion Interchange

Oriented, microporous fibers, the same as Example 16, were placed in a 100 cc burette. The fiber ped was in a sodium salt form. A solution containing 600 ppm of potassium ions (from potassium nitrate) was pumped through the bed at a flow rate of 12 bed vol./hr. The treated solution contained only 6 ppm of potassium ion (99.3% potassium removal) and about 350 ppm of sodium (discharged during interchange with the potassium).

The bed was purged with deionized water and a feed stream containing 600 ppm of sodium ion was pumped through the bed (now in a potassium salt form) at a flow rate of 12 bed vol./hr. The treated solution contained 2 ppm sodium ion (99.7% sodium removal) and about 1000 ppm of potassium (discharged interchange with sodium).

EXAMPLE 21

Alkaline Earth Metal Exchange with Other Metals

Oriented, microporous fibers, the same as Example 15, were placed in a 100 cc burette. The fiber bed was in a sodium salt form, but was converted to a calcium salt form by pumping through an excess of a calcium solution (from calcium nitrate). A solution containing 200 ppm calcium ions and also a second metal of either copper (cupric) ions, chromium III ions, or iron (ferric) ions, was pumped through the bed at a flow rate of 12 bed vol./hr. with the following results:

| Feed Solution | Treated Solution (ppm) | (% Removed) |
|---|---|---|
| 200 ppm $Cu^{++}$ | <1 | >99.5 |
| 100 ppm $Cr^{+++}$ | <1 | >99.0 |
| 10 ppm $Fe^{+++}$ | <.2 | >98.0 |

A solution containing 200 ppm magnesium ion and 200 ppm copper (cupric) ion was treated as above and contained <1 ppm copper after treatment (99.5% copper removal) and 200 ppm magnesium (no magnesium removal).

A bed of the fiber, in the magnesium salt form (derived by saturation of the sodium salt form with excess magnesium nitrate), was treated with a solution containing 200 ppm of cupric ion (from cupric nitrate) and also 200 ppm of calcium (from calcium nitrate) at a flow of 12 bed vol./hr. The treated solution contained <1 ppm copper and <1 ppm calcium, but contained approximately 200 ppm of magnesium, which was discharged during the interchange with cupric and calcium ions. The interchange gave >99.5% copper and calcium removal.

EXAMPLE 22

Cleaning Up Spills Containing Metals

A quantity of an aqueous solution containing polyvalent metal cations, spilled out on the ground, is treated by spreading ECA microporous particles, especially in the form of an aqueous dispersion, into the spill. Soon afterward, the spill is taken up and the ECA particles, now containing most of the metal cation values are separated from the aqueous medium, such as by filtration. A mixture of microporous ECA fibers mixed into an aqueous dispersion of microporous ECA small particles is especially effective in this type of operation.

In comparision, ordinary ion exchange resin beads, such as a DVB (divinylbenzene) cross-linked polymer of styrene having pendent iminodiacetic acid groups (also known as a weak acid chelating resin) or a DVB cross-linked polyacrylic acid resin (a macroporous bead) exhibits very little effectiveness in this type of operation.

EXAMPLE 23

Exchanging $Na^+$ and $K^+$ ions

Microporous ECA particles, having —COOH groups neutralized by NaOH to —COONa groups, will, when contacted with an "overwhelming" amount of KOH, have most of the —COONa groups converted to —COOK groups. Conversely, particles having —COOK groups are converted to COONa groups by being contacted with an overwhelming amount of NaOH.

We claim:

1. A method of removing metal contaminants from solution in an aqueous liquid, an organic liquid, or a liquid which is aqueous and organic, said method comprising contacting the said liquid with an ethylene polymer having pendent carboxylic acid groups or pendent carboxylic acid groups in the salt form, said polymer being in microporous, particulate form, and having a surface area/weight ratio of at least about 0.5 $m^2$/gm, for a time sufficient to cause the metal values to affix to the polymer, and separating the liquid from the polymer, wherein the ethylene polymer comprises ethylene interpolymerized with about 10% to about 40% by weight of an olefinically unsaturated carboxylic acid of the group consisting of acrylic acid, methacrylic acid, crotonic acid, fumaric acid, maleic acid, and butenoic acid.

2. The method of claim 1 wherein the liquid is aqueous.

3. The method of claim 1 wherein the liquid is organic.

4. The method of claim 1 wherein the liquid is both aqueous and organic.

5. The method of claim 1 wherein the metal comprises at least one of the metals found in Periodic Table Groups IA, IIA, IIIB, IVB, VB, VIB, VIIB, VIII, IB, IIB, IIIA, IVA, VA, and VIA.

6. The method of claim 1 wherein the metal comprises at least one having a valence of 2 or 3.

7. The method of claim 1 wherein the metal comprises at least one of Periodic Table Groups IB, IIB, and VIII.

8. The method of claim 1 wherein the organic liquid comprises a halogenated hydrocarbon.

9. The method of claim 1 wherein the ethylene polymer comprises ethylene copolymerized with acrylic acid.

10. The method of claim 1 wherein the ethylene polymer comprises ethylene copolymerized with methacrylic acid.

11. The method of claim 1 wherein the ethylene polymer comprises fibers which are microporous.

12. The method of claim 1 wherein the ethylene polymer comprises an array of small particles or fibers composited in the manner of a filter material.

13. The method of claim 1 wherein the ethylene polymer comprises a woven, non-woven, knitted, or sintered array of fibers or filaments.

14. The method of claim 1 wherein the polymer, after separation from the liquid, is regenerated by the use of a reactant to remove the metal from the polymer, and using the so-regenerated polymer for removing metal values from additional quantities of liquid.

15. The method of claim 1 wherein the liquid, after separation from the polymer, is contacted with an additional quantity of the polymer to further reduce the amount of metal values in the liquid.

16. The method of claim 1 wherein the surface area/weight ratio is at least 2 $m^2/gm$.

17. The method of claim 1 wherein the surace area/weight ratio is at least 4 $m^2/gm$.

18. The method of claim 1 wherein the surface area/weight ratio is at least 5 $m^5/gm$.

19. The method of claim 1 wherein the salt form of the carboxylic acid is an organic salt.

20. The method of claim 1 wherein the salt form of the carboxylic acid is an inorganic salt.

21. The method of claim 1 wherein the said particulate ethylene polymer is in the form of a dispersion, colloid, or suspension in a liquid.

22. The method of claim 1 wherein the amount of the said acid is in the range of about 14% to about 35% by weight.

23. The method of claim 1 wherein the amount of the said acid is in the range of about 20% to about 35% by weight.

* * * * *

UNITED STATES PATENT AND TRADEMARK OFFICE
CERTIFICATE OF CORRECTION

PATENT NO. : 4,747,954

DATED : May 31, 1988

INVENTOR(S) : Walter L. Vaughn et al

It is certified that error appears in the above-identified patent and that said Letters Patent is hereby corrected as shown below:

Col. 2, line 22, "frpm" should be --from--.
Col. 2, line 51, "acic" should be --acid--.
Col. 8, line 51, "CalcIum" should be --Calcium--.
Col. 13, line 28, "ped" should be --bed--.
Col. 16, line 13, "$m^5$/gm." should be --$m^2$/gm.--.

Signed and Sealed this

Twentieth Day of December, 1988

*Attest:*

DONALD J. QUIGG

*Attesting Officer*   *Commissioner of Patents and Trademarks*